(12) United States Patent
Foth et al.

(10) Patent No.: US 7,526,117 B2
(45) Date of Patent: Apr. 28, 2009

(54) METHOD FOR REMOTE CHECK CAPTURE

(75) Inventors: Thomas J Foth, Trumbull, CT (US);
Jeffrey D Pierce, Sandy Hook, CT (US);
Hillary Carey-Steckbauer, San Jose, CA (US)

(73) Assignee: Pitney Bowes Inc., Stamford, CT (US)

( * ) Notice: Subject to any disclaimer, the term of this patent is extended or adjusted under 35 U.S.C. 154(b) by 745 days.

(21) Appl. No.: 11/252,044

(22) Filed: Oct. 17, 2005

(65) Prior Publication Data

US 2007/0086642 A1    Apr. 19, 2007

(51) Int. Cl.
*G06K 9/00* (2006.01)
*G06Q 40/00* (2006.01)
(52) U.S. Cl. .......................................... 382/137; 705/45
(58) Field of Classification Search ......... 382/137–140; 705/45; 235/375–381; 209/534
See application file for complete search history.

(56) References Cited

U.S. PATENT DOCUMENTS

2005/0149440 A1* 7/2005 Michelassi et al. ............ 705/45
2005/0289059 A1* 12/2005 Brewington et al. .......... 705/45

* cited by examiner

*Primary Examiner*—Samir A. Ahmed
*Assistant Examiner*—Mehdi Rashidian
(74) *Attorney, Agent, or Firm*—Ronald Reichman; Angelo N. Chaclas

(57) ABSTRACT

A method of enabling remote deposit of checks includes receiving at a second site a plurality of check images and a plurality of entered dollar amounts, wherein the check images were generated at the depositor site by scanning the checks and the entered dollar amounts were manually entered at the depositor site. Each of the entered dollar amounts correspond to a respective one of the check images. The check dollar amounts are read from the check images at the second site using character recognition, and certain of the entered dollar amounts are used as hints to improve the accuracy of the character recognition. The enhanced character recognition results are provided to the depository bank along with the check images to enable the checks to be deposited in the depositor's account.

11 Claims, 3 Drawing Sheets

METHOD FOR REMOTE CHECK CAPTURE

FIELD OF THE INVENTION

The present invention relates to check deposit systems, and in particular to a method for remote check image capture and deposit.

BACKGROUND OF THE INVENTION

Traditionally, businesses have deposited checks received from, for example, customers by physically taking them to a branch of their bank and depositing them over the counter with a teller or dropping them into a night deposit box. The actual physical presentation of checks to be deposited was necessary because, under prior banking laws, the depository bank had to present the original of each check to the corresponding paying bank in order to clear the check. This changed in October of 2004 with the enactment of The Check Clearing for the $21^{st}$ Century Act, commonly referred to as Check 21. Check 21 removed the legal requirement that an original paper check had to be presented to obtain payment. Instead, banks can now use digital images to transport check data from the bank of first deposit to the paying bank. If the paying bank cannot process a check image, the image can be printed, according to certain specifications, to create what is known as a substitute check, which is the legal equivalent of the original paper check. Check 21 has thus opened the door for remote check deposit solutions wherein check images, rather than original paper checks, are used to make deposits, thereby enabling businesses to eliminate trips to the bank. In addition, the use of check images also reduces check transportation costs among banks and improves funds availability.

Currently, in order to implement most remote check deposit solutions, a depositor must have a personal computer (PC) loaded with special application software, a scanner, and a secure internet connection. When the depositor wishes to make a deposit, an operator, such an accounts receivable clerk, scans each of the checks to be deposited. As the checks are scanned, an image of each of the checks is generated and displayed on the PC and the operator keys in the dollar amount of each check. Alternatively, the PC may be provided with optical character recognition (OCR) software that is adapted to obtain the dollar amount of each check directly from the scanned image. In this case, the operator views the check images in the display and verifies or corrects the amounts that are recognized by the OCR software. In either case, once the images are created and the dollar amount of each check is obtained, that information is transmitted through the Internet to the depository bank and is used to make the appropriate deposits to the depositor's account. While such systems add convenience for depositors and reduce the amount of, and thus the cost of, bank operator intervention, they require PCs and software at the depositor site that are relatively expensive and that introduce problems associated with software, maintenance and holes. Alternatively, at least one dedicated check scanning device that includes an integrated scanner, keyboard and limited LCD is commercially available in the form of the Synergy™ scanner sold by RDM Corporation of Waterloo Canada. This device, however, requires that checks be scanned and information related thereto be entered one at a time, which may prove inefficient and inconvenient for many operators. Another alternative is to merely transmit check images to the depository bank and have bank personnel verify and/or correct check amounts manually or in cooperation with OCR software. As will be appreciated, such a solution, while effective, increases the frequency at which bank personnel must be involved in the check deposit process, which adds expense and consumes bank resources.

Thus, there is a need for a remote check capture system and method that both reduces costs associated with and increases efficiency and convenience at the depositor's site and at the same time does not significantly increase the involvement required by bank personnel.

SUMMARY OF THE INVENTION

The present invention relates to a method of enabling the remote deposit of a plurality of checks in a depository bank from a depositor site. The method includes receiving at a second site a plurality of check images and a plurality of entered dollar amounts, wherein the check images were generated at the depositor site by scanning the checks, and wherein each of the entered dollar amounts were entered at the depositor site. In addition, each of the entered dollar amounts correspond to a respective one of the check images. The method further includes using character recognition at the second site to read a first recognized dollar amount from each of the check images and assign a confidence level to each of the first recognized dollar amounts. The check images are then divided into a high confidence group and a low confidence group, wherein each of the check images in the high confidence group have a confidence level corresponding thereto that is greater than or equal to a predetermined level, and each of the check images in the low confidence group have a confidence level corresponding thereto that is less than the predetermined level. The entered dollar amounts corresponding to the check images in the low confidence group form a group of unmatched entered dollar amounts. For each one of one or more of the check images in the low confidence group, the method includes using character recognition with a selected one of the unmatched entered dollar amounts acting as a hint to read a second recognized dollar amount from the check image wherein the second recognized dollar amount value has a confidence level that is greater than or equal to the predetermined level. Finally, the method includes providing to the depository bank deposit information including at least (i) the check images in the high confidence group, (ii) the first recognized dollar amount corresponding to each of the check images in the high confidence group, (iii) the check images in the low confidence group, and (iv) the second recognized dollar amount corresponding to each of the one or more of the check images in the low confidence group. The deposit information is then used by the depository bank to deposit the checks into the account of the depositor.

The one or more of the check images in the low confidence group may be all of the check images in the low confidence group. Alternatively, the one or more of the check images in the low confidence group may be less than all of the check images in the low confidence group. In that case, the method further includes viewing the remaining check images at the second site and assigning a second entered dollar amount to each of the remaining check images. The deposit information in this case further includes the second dollar amount assigned to each of the remaining check images.

In one particular embodiment, the receiving step further includes receiving a total dollar amount from the depositor site that is calculated by summing the entered dollar amounts together. In addition, the method further includes calculating a high confidence total by summing together the first recognized dollar amount corresponding to each of the check images in the high confidence group and the second recognized dollar amount corresponding to each of the one or more of the check images in the low confidence group. The providing step in this embodiment is performed only if the total dollar amount is equal to the high confidence total. If the total dollar amount is not equal to the high confidence total, the method may further include generating second deposit information by viewing one or more of the check images in the low confidence group and the check images in the high confidence group and correcting one or more of the first recognized dollar amount corresponding to each of the check images in the high confidence group and the second recognized dollar amount corresponding to each of the one or more of the check images in the low confidence group.

Alternatively, where appropriate, the high confidence total may be created by summing together the first recognized dollar amount corresponding to each of the check images in the high confidence group, the second recognized dollar amount corresponding to each of the one or more of the check images in the low confidence group and the second dollar amount assigned to each of the remaining check images. In this embodiment, the correcting step may include correcting one or more of the first recognized dollar amount corresponding to each of the check images in the high confidence group, the second recognized dollar amount corresponding to each of the one or more of the check images in the low confidence group, and the second dollar amount assigned to each of the remaining check images.

Each of the entered dollar amounts is preferably entered at the depositor site in the blind, i.e., without viewing the corresponding respective one of the check images (instead the checks themselves or a listing of check values is viewed). Furthermore, the second site may be operated by the depository bank, wherein the providing step comprises providing the deposit information to a depository bank computer (at the same or a different site). Alternatively, the second site may be operated by a third party not affiliated with the depository bank.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
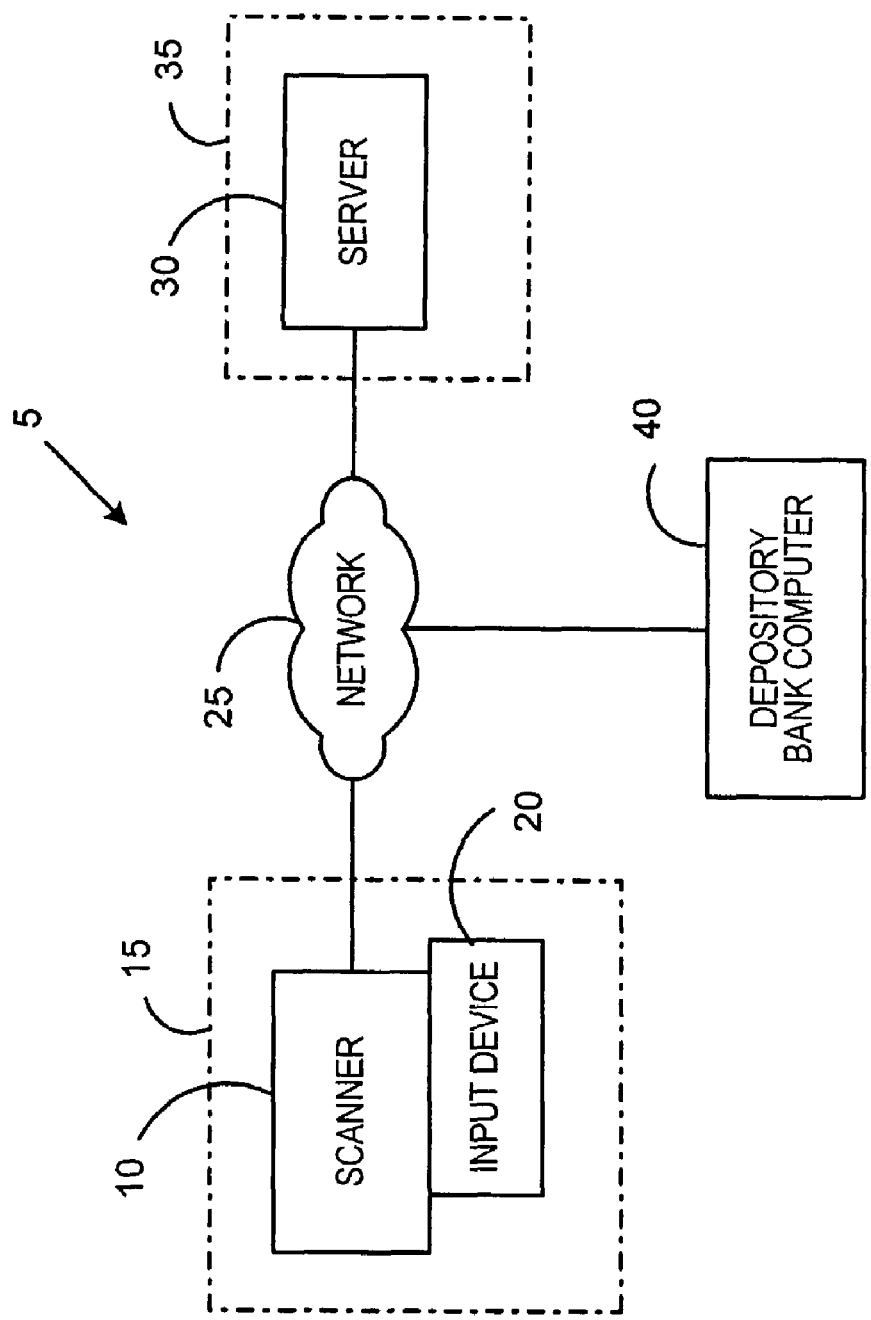
FIG. 1 is a block diagram of remote check capture system according to the present invention.

FIG. 1 is a block diagram of a remote check capture system 5 according to the present invention. Remote check capture system 5 enables a depositor to remotely deposit a number of checks in a particular depository bank. Remote check capture system 5 includes a digital scanner 10 located at a depositor location 15 for scanning and thereby creating electronic images of the checks to be deposited. The digital scanner 10 includes an input device 20 that enables an operator of the digital scanner 10, such as an accounts receivable clerk, to input information, as described herein, into the digital scanner 10. The input device 20 may be, for example, a keypad, a keyboard, a touch screen or the like provided as part of the digital scanner 10. The digital scanner 10 also includes a processing unit (not shown), such as a microprocessor, and a memory (not shown), which may be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory stores routines that are executable by the processing unit and that implement the functionality of the digital scanner 10 according to the present invention as described in connection with FIGS. 2A and 2B below.

The digital scanner 10 is in electronic communication with a network 25, which may be, for example, the Internet, one or more private computer networks, or any combination thereof. Remote check capture system 5 further includes server 30 located at a service provider location 35. The server 30 is in electronic communication with the network 25. Finally, the remote check capture system 5 includes a depository bank computer 40, which is a computer designated by the depository bank to receive and process electronic deposit information. The service provider location 35 may be a facility operated by a third party, in which case the third party provides the services described herein, or a facility operated by the depository bank, in which case the depository bank itself provides the services described herein.

Figure 2A:
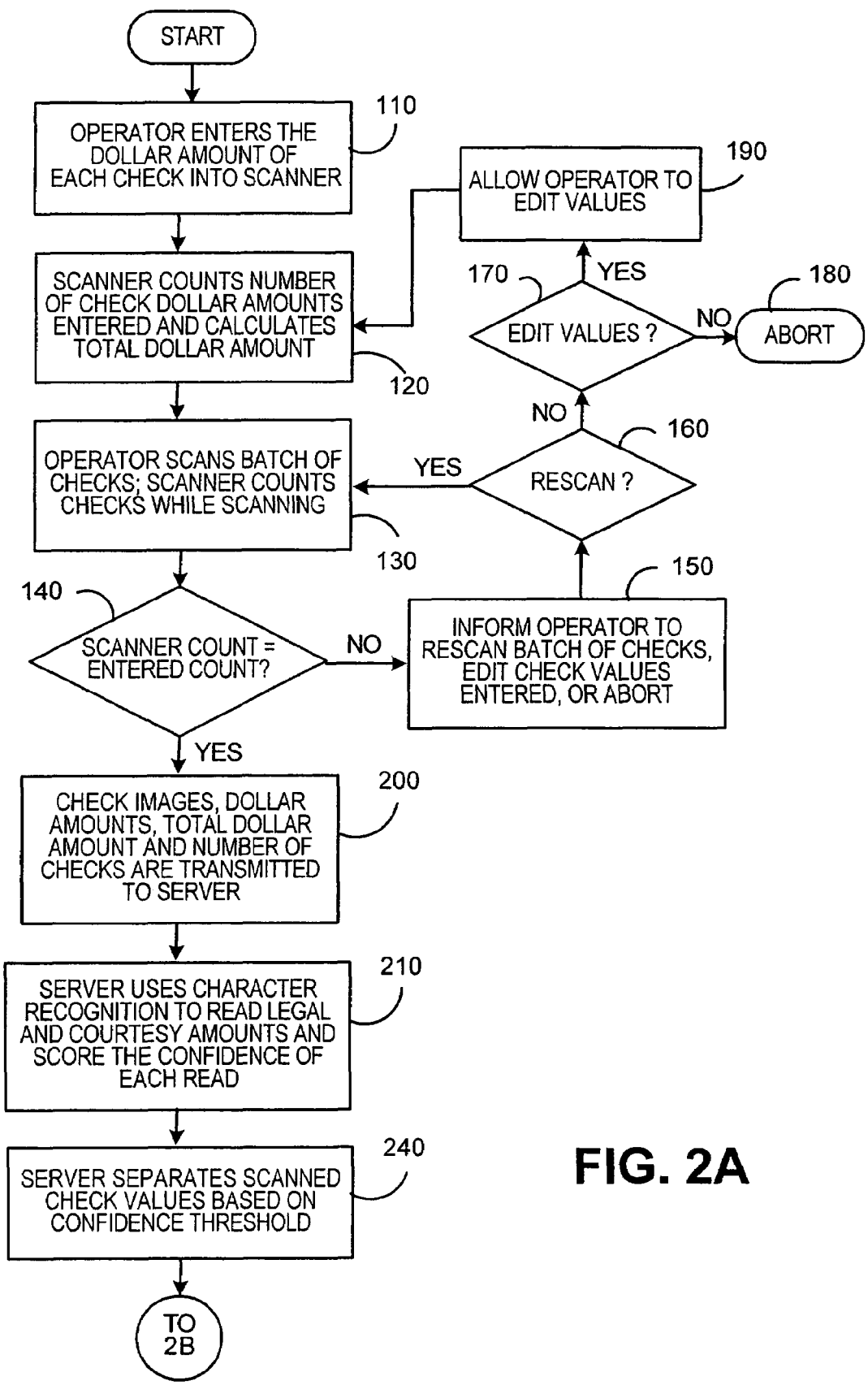
FIGS. 2A and 2B are flowcharts illustrating a method of operation of the remote check capture system shown in FIG. 1.
Figure 2B:
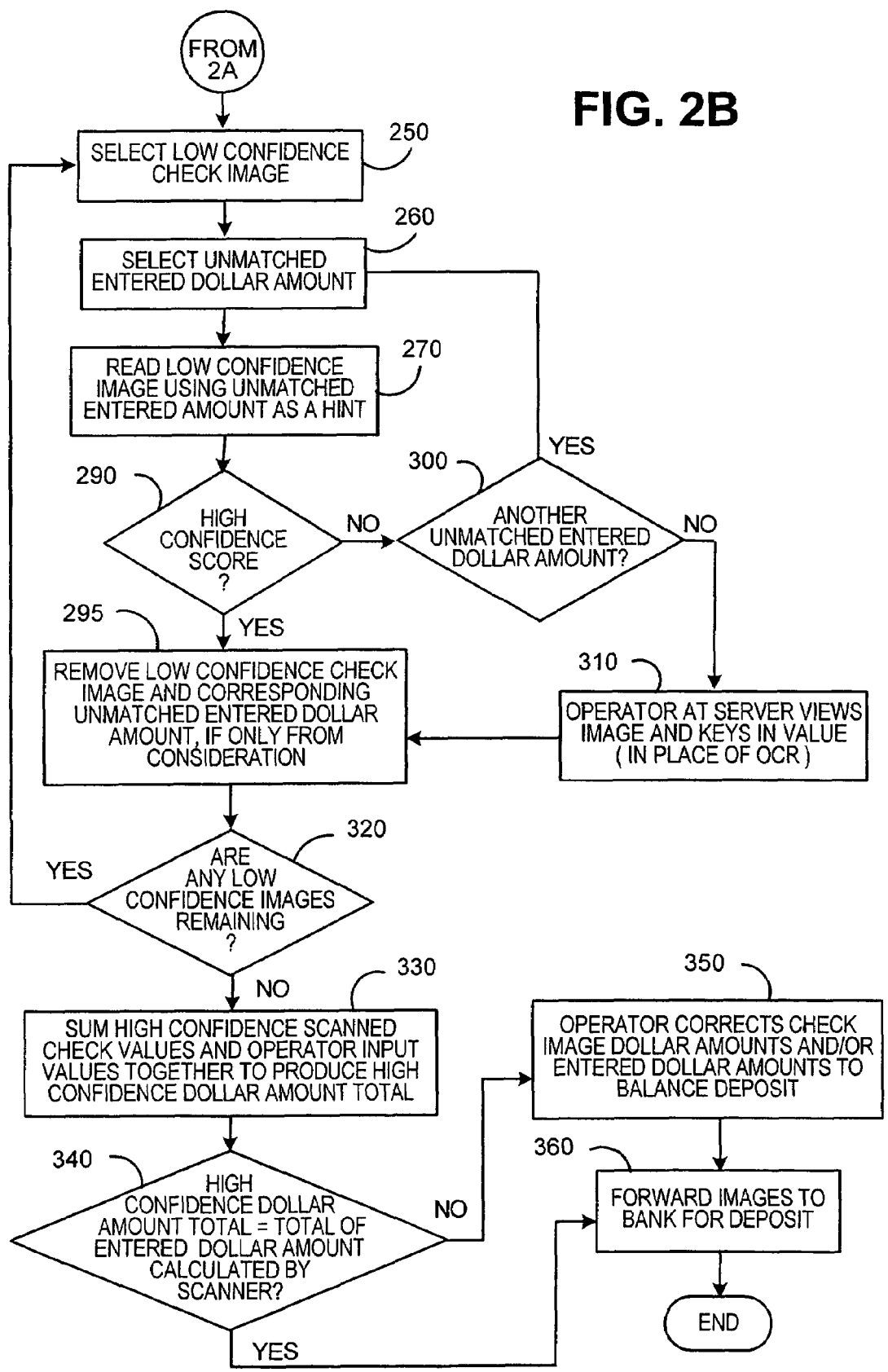

FIGS. 2A and 2B are flowcharts that illustrate the method of operation of the remote check capture system 5 according to the present invention. The method begins at step 110, where an operator of the digital scanner 10, such as an accounts receivable clerk of the depositor, enters the dollar amount of each of the checks to be deposited into the digital scanner 10 using the input device 20. Preferably, the digital scanner 10 is not coupled to a PC and does not include a sophisticated display for displaying check images, thereby reducing the costs. As a result, an operator enters the dollar amounts "in the blind," i.e., without seeing an electronic image of each check on a display. The operator may obtain the dollar amount of each check by viewing the physical checks in the batch to be deposited before they are scanned as described below or from a listing of the amount of each check in the batch to be deposited. At step 120, the digital scanner 10 counts the number of check dollar amounts that were entered in step 110 and calculates a total of those amounts. Next, at step 130, the operator scans each of the checks using digital scanner 10 to create a digital image of each of the checks. In addition, the digital scanner 10 counts the number of checks that were scanned. At step 140, a determination is made as to whether the number of checks that were scanned, as determined by the digital scanner 10, is equal to the number of check dollar amounts that were entered in step 110. If the answer at step 140 is no, then, at step 150, the digital scanner 10 informs the operator that there is a problem and requests that the operator rescan the checks, edit the dollar amount values that were entered, or abort the deposit. Preferably, the digital scanner 10 is provided with an inexpensive display (not shown), such as an LCD, for the purposes of conveying this information to the operator. However, for cost saving reasons, this display need not, and preferably is not, sophisticated enough to display images of the checks.

At step 160, a determination is made as to whether the operator has chosen to rescan the checks. If the answer is yes, then the method returns to step 130. If, however, the answer is no, then the method proceeds to step 170, wherein a determination is made as to whether the operator has chosen to edit check related information that was input at step 110. If the answer is no, then the method proceeds to step 180, wherein the deposit is aborted. However, if the answer at step 170 is yes, then, at step 190, the operator is able to enter edited dollar amount values for one or more of the checks, add a dollar amount for a previously omitted check or checks, or delete one or more dollar amounts that were previously entered in error using the input device 20, and thereafter the method returns to step 120.

Returning to step 140, if the answer is yes, meaning that the number of scanned checks counted by the digital scanner 10 equals the number of entered dollar amounts, then, at step 200, the digital image of each check, the entered dollar amount for each check, the calculated total dollar amount, and the number of checks that were scanned are transmitted to the server 30 through the network 25. Note that there is no requirement that the order of the entered dollar amounts match up with the order of the images of each of the checks.

The server 30 is provided with special optical character recognition software that is commonly referred to as courtesy amount recognition (CAR) software and legal amount recognition (LAR) software. The CAR/LAR software is able to obtain from each check image the courtesy amount (which is the numerical dollar amount written on the check) and the legal amount (which is the dollar amount of the check written out in words). CAR/LAR software is well known in the art, and is commercially available from a number of different vendors such as Wausau Financial Systems and A2iA Corp.

As is known, most CAR/LAR software provides a confidence score each time it performs a read operation which indicates a relative confidence, typically expressed as a percentage, in the accuracy of the dollar amount obtained from a check image as a result of the read. At step 210, the server 30 uses the CAR/LAR software provided therewith to read the courtesy amounts and legal amounts from each received check image and uses those reads to provide a scanned check value for each check image. In addition, the CAR/LAR software of the server 30 scores the confidence of each read. Next, at step 240, the server 30 separates those scanned check values having a high confidence score associated therewith from those having a low confidence score associated therewith (referred to as the high confidence scanned check values and the low confidence scanned check values, respectively, for convenience). According to an aspect of the invention, a predetermined score value is used to separate high confidence from low confidence. For example, a confidence score of 85% or higher may be considered to be high confidence and a confidence score of less than 85% may be considered to be low confidence. These values will be set by each financial institution on a case by case basis, and may actually vary for each different depositor based on their history with the financial institution (i.e., are they considered particularly trustworthy, or perhaps less than trustworthy for some reason). Each entered check dollar amount that matches a high confidence scanned check value is removed from consideration. In addition, the remaining entered check dollar amounts (i.e., those not corresponding to a high confidence scanned check value) are grouped together as a collection of what are referred to as unmatched entered dollar amounts. Also grouped together are the check images that produced a low confidence scanned check value, referred to as low confidence images.

Referring to FIG. 2B, the method proceeds to step 250, wherein a first one of the low confidence images is selected for evaluation. Next, at step 260, one of the unmatched entered dollar amounts is selected. In step 270, the selected low confidence image and unmatched entered dollar amount are provided to the CAR/LAR software. The CAR/LAR software again attempts to read the courtesy amount and legal amount from the selected low confidence image to produce a scanned check value, but this time it uses the obtained entered dollar amount as a hint. What this means is that, during a read, the CAR/LAR software calculates the probability that each digit of the courtesy amount is a specific value based on recognition and context (that is agreement between the legal and courtesy amounts). If the probabilities are about the same for two or more digits, the obtained entered dollar amount will be used to try to increase the probability for one of the digits. For example, if the actual check amount is $1.00, the CAR/LAR software score may score the read equally between $1.00 and $7.00, because the legal amount is not recognizable. If the obtained entered dollar amount currently being used as a hint is $1.00, then the score for $1.00 will be increased. Step 270 will result in another scanned check value and another confidence score being provided for this read attempt.

At step 290, a determination is made as to whether that confidence score qualifies as a high confidence score (i.e., is it greater than the predetermined threshold value?). If the answer at step 290 is yes, then, at step 295, the current low confidence image and corresponding current unmatched entered check dollar amount are removed from consideration. If the answer at step 290 is no, meaning that the confidence score is not sufficiently high notwithstanding the hint, then, at step 300, a determination is made as to whether there are any remaining unmatched entered dollar amounts that have not yet been used as a hint. If the answer at step 300 is yes, then the method returns to step 260, wherein the next unmatched entered dollar amount is obtained for use as a hint. Thus, as will be appreciated, steps 260,270,290 and 300 will result in one or more of the unmatched entered dollar amounts being used as a hint in an attempt to improve the confidence score of the character recognition performed on the low confidence image.

If the answer at step 300 is no, meaning that all of the unmatched entered dollar amounts have been used as a hint and none of them have resulted in a sufficiently high confidence score, then, at step 310, an operator at the server 30 views the current low confidence image and, preferably, all of the unmatched entered dollar amounts and keys in the appropriate dollar amount for the check in question. Following step 310, the method proceeds to step 295 wherein that low confidence image, and one of the unmatched entered dollar amounts if it was entered by the operator as the appropriate dollar amount for the check in question, are removed from consideration. If the answer at step 290 is yes, then, at step 295, the check image and the corresponding entered check dollar amount are removed from consideration.

Next, at step 320, a determination is made as to whether there are any low confidence images remaining that have not yet been processed. If the answer is yes, then the method proceeds to step 250, wherein the next low confidence image is selected and is further processed as described above. If, however, the answer at step 320 is no, meaning that all of the low confidence images have been processed, then, at step 330, the following values are summed together to produce a high confidence dollar amount total: (i) the scanned check values corresponding to the high confidence images read in step 210, (ii) the scanned check values read in step 270 that, with the hint, resulted in a high confidence score, and (iii) any dollar amounts entered by the operator in step 310. Next, a determination is made as to whether the high confidence dollar amount total is equal to the total dollar amount value calculated in step 120 and subsequently transmitted to the server 30 in step 200. If the answer at step 340 is yes, the method proceeds to step 360, wherein all of the check images are forwarded to depository bank computer 40 through network 25. In addition, along with the check images, certain dollar amount information is also forwarded to the depository bank computer 40 through network 25. Specifically, for any check image for which a high confidence score was able to be obtained (in either step 210 or 270), the OCR read dollar amount (the scanned check value) is forwarded to the depository bank computer 40. For any check images for which an operator entered a dollar amount in step 310, that dollar amount is forwarded to the depository bank computer 40. The information received by the depository bank computer 40 is used to enable the checks to be deposited into the depositor's account at the depository bank.

If the answer is at step 340 is no, then, at step 350, an operator at the server 30 manually corrects the dollar amounts associated with each check image as necessary so that the information is correct for all images. The method then proceeds to step 360, wherein the check images and the dollar amounts, corrected as necessary, are forwarded to the depository bank computer 40 for use in enabling the checks to be deposited into the depositor's account at the depository bank.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of enabling the remote deposit of a plurality of checks in a depository bank from a depositor site, comprising:
    Using a server to perform the steps of:
    receiving at a second site a plurality of check images and a plurality of entered dollar amounts, said check images being generated at said depositor site by scanning said checks, each of said entered dollar amounts being entered at said depositor site and corresponding to a respective one of said check images;
    using character recognition at said second site to read a first recognized dollar amount from each of said check images and assign a confidence level to each of said first recognized dollar amounts;
    dividing said check images into a high confidence group and a low confidence group, each of the check images in said high confidence group having a confidence level corresponding thereto that is greater than or equal to a predetermined level, each of the check images in said low confidence group having a confidence level corresponding thereto that is less than said predetermined level, the entered dollar amounts corresponding to the check images in said low confidence group forming a group of unmatched entered dollar amounts;
    for each one of one or more of the check images in said low confidence group, using character recognition with a selected one of said unmatched entered dollar amounts acting as a hint to read a second recognized dollar amount from the one of said one or more of the check images wherein the second recognized dollar amount value has a confidence level that is greater than or equal to said predetermined level; and
    providing to said depository bank deposit information including at least (i) said check images in said high confidence-group, (ii) the first recognized dollar amount corresponding to each of said check images in said high confidence group, (iii) said check images in said low confidence group, and (iv) the second recognized dollar amount corresponding to each of said one or more of the check images in said low confidence group, said deposit information being used by said depository bank to deposit said checks.

2. The method according to claim 1, wherein said one or more of the check images in said low confidence group comprise all of the check images in said low confidence group.

3. The method according to claim 1, wherein said one or more of the check images in said low confidence group comprise less than all of the check images in said low confidence group, wherein the check images in said low confidence group not included in said one or more of the check images in said low confidence group comprise one or more remaining check images, the method further comprising viewing said remaining check images at said second site and assigning a second entered dollar amount to each of said remaining check images, said deposit information further comprising the second dollar amount assigned to each of said remaining check images.

4. The method according to claim 2, said receiving step further comprising receiving a total dollar amount from said depositor site, said total dollar amount being calculated at said depositor site by summing said entered dollar amounts together, the method further comprising calculating a high confidence total by summing together the first recognized dollar amount corresponding to each of said check images in said high confidence group and the second recognized dollar amount corresponding to each of said one or more of the check images in said low confidence group, wherein said providing step is performed only if said total dollar amount is equal to said high confidence total.

5. The method according to claim 4, wherein, if said total dollar amount is not equal to said high confidence total, the method further comprises generating second deposit information by viewing one or more of the check images in said low confidence group and the check images in said high confidence group and correcting one or more of the first recognized dollar amount corresponding to each of said check images in said high confidence group and the second recognized dollar amount corresponding to each of said one or more of the check images in said low confidence group.

6. The method according to claim 3, said receiving step further comprising receiving a total dollar amount from said depositor site, said total dollar amount being calculated at said depositor site by summing said entered dollar amounts together, the method further comprising calculating a high confidence total by summing together the first recognized dollar amount corresponding to each of said check images in said high confidence group, the second recognized dollar amount corresponding to each of said one or more of the check images in said low confidence group and the second dollar amount assigned to each of said remaining check images, wherein said providing step is performed only if said total dollar amount is equal to said high confidence total.

7. The method according to claim 6, wherein, if said total dollar amount is not equal to said high confidence total, the method further comprises generating second deposit information by viewing one or more of the check images in said low confidence group and the check images in said high confidence group and correcting one or more of the first recognized dollar amount corresponding to each of said check images in said high confidence group, the second recognized dollar amount corresponding to each of said one or more of the check images in said low confidence group, and the second dollar amount assigned to each of said remaining check images.

8. The method according to claim 7, wherein each of said entered dollar amounts is entered at said depositor site without viewing the corresponding respective one of said check images.

9. The method according to claim 1, wherein said second site is operated by said depository bank and wherein said providing step comprises providing said deposit information to a depository bank computer.

10. The method according to claim 1, wherein said second site is operated by a third party not affiliated with said depository bank.

11. The method according to claim 1, wherein said providing step comprises providing said deposit information to a depository bank computer.

* * * * *